United States Patent [19]

Cina, Jr.

[11] Patent Number: 4,930,073
[45] Date of Patent: May 29, 1990

[54] METHOD TO PREVENT USE OF INCORRECT PROGRAM VERSION IN A COMPUTER SYSTEM

[75] Inventor: Vincent J. Cina, Jr., Spring Valley, N.Y.

[73] Assignee: International Business Machines Corporation, Armonk, N.Y.

[21] Appl. No.: 66,909

[22] Filed: Jun. 26, 1987

[51] Int. Cl.$^5$ ............... G06F 13/00; G06F 11/00; G06F 12/14; H04L 9/00

[52] U.S. Cl. .................. 364/300; 364/222.5; 364/246.6; 364/246.7; 364/246.8; 364/232.7; 350/23; 350/25

[58] Field of Search ... 364/200MS File, 900 MS File, 364/300; 380/23, 25

[56] References Cited

U.S. PATENT DOCUMENTS

| | | | |
|---|---|---|---|
| 4,038,645 | 7/1977 | Birney et al. | 364/200 |
| 4,366,537 | 12/1982 | Heller et al. | 364/200 |
| 4,375,579 | 3/1983 | Davida et al. | 380/25 |
| 4,588,991 | 5/1986 | Atalla | 380/25 |
| 4,652,990 | 3/1987 | Pailen et al. | 364/200 |
| 4,757,534 | 7/1988 | Matyas et al. | 380/25 |

Primary Examiner—Archie E. Williams, Jr.
Assistant Examiner—Emily Y. Chan
Attorney, Agent, or Firm—Douglas W. Cameron

[57] ABSTRACT

A method prevents an incorrect program version from being executed by a computer system. More specifically, a synchronization key is contained in a load module and is used to encrypt that load module which also contains a protected program. The encrypted load module with the protected program and synchronization key therein is stored in auxiliary storage. The synchronization key and program name are then placed in a table in a secure memory. When the program is requested for execution, the synchronization key in the protected table corresponding to the program name is used to decrypt the load module. The synchronization key in the load module is then extracted and compared with the synchronization key which is stored in a protected table and associated with the protected program. If the two synchronization keys are the same, then the decrypted protected program is loaded into the main memory for execution.

4 Claims, 4 Drawing Sheets

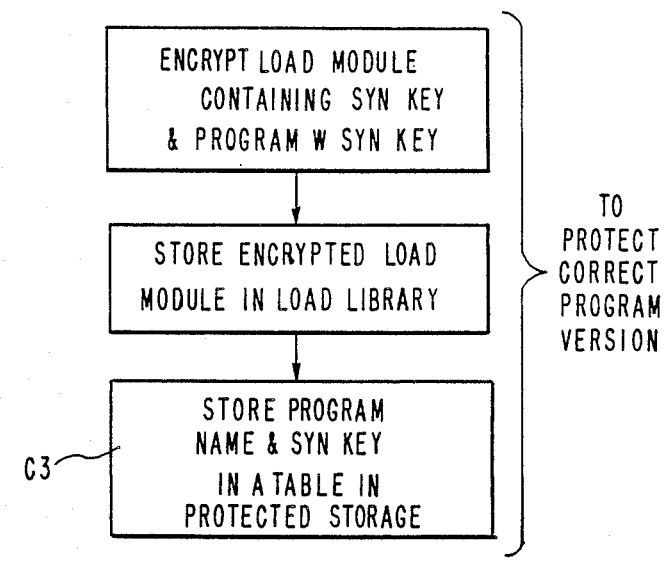
FIG. 3
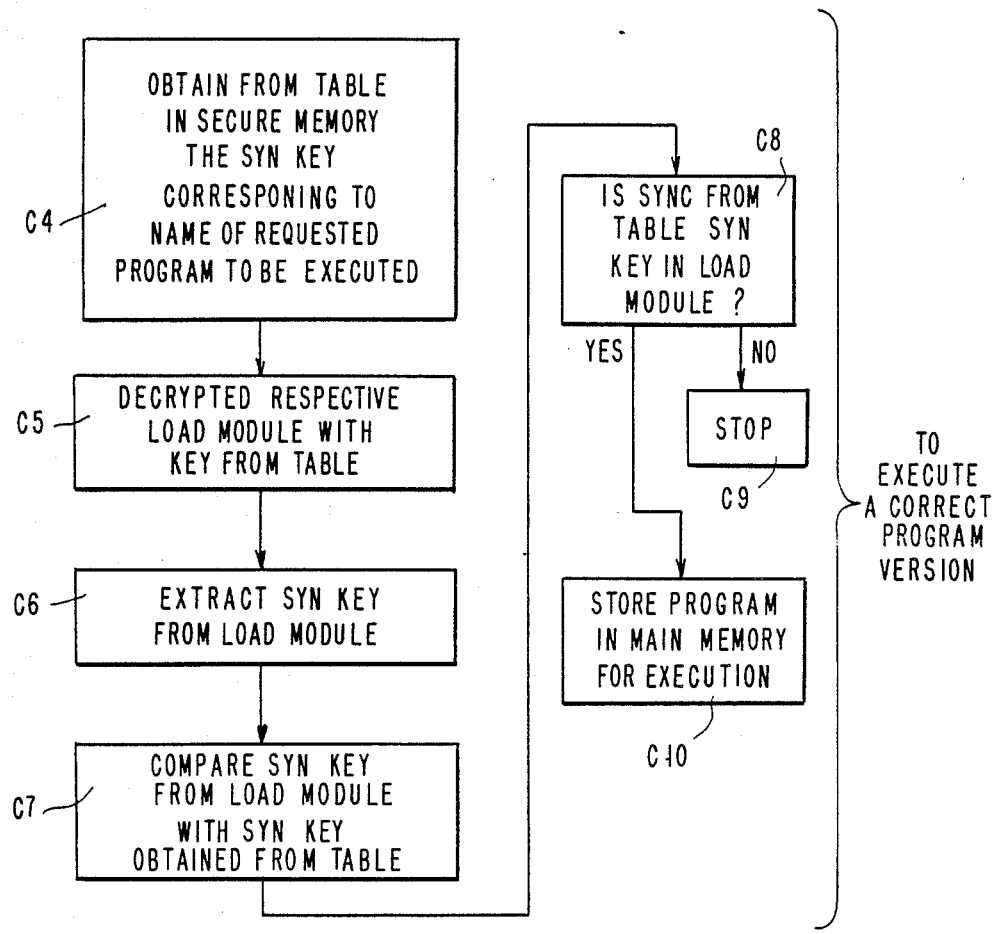

METHOD TO PREVENT USE OF INCORRECT PROGRAM VERSION IN A COMPUTER SYSTEM

DESCRIPTION

1. Technical Field

This invention relates to a method and apparatus for preventing an incorrect program version from executing in a computer system. More specifically, a synchronization key, stored in and used to encrypt a load module containing a protected program, is compared with a synchronization key stored in a protected table and associated with the protected program. If the two synchronization keys are the same, then the protected program is loaded into main memory for execution. The keys for each program are developed and stored when each program is prepared for external storage.

2. Description of the Prior Art

In a large, centrally controlled, computer system there are many programs including application programs, subsystem programs, and system programs. These programs are usually stored on external media, such as direct access storage devices (DASD) or tape for archiving, backup, recovery, and disaster planning purposes. Most application programs are loaded into the computer systems memory only when they are being used. Programs are loaded into memory from their external storage media when they are required for execution. A system program called 'program fetch' is used to load the program from external media into memory. Programs on external media are in a form called 'load module' format. Load modules reside in a 'load library'.

There are usually many copies of a program load library produced. The data processing department may backup program load libraries from disk to tape or mass storage frequently, possibly once a day. Tapes may be kept in a tape library or transported off site for disaster planning purposes. Many people have access to the program load libraries on backup tapes and backup disks. For example, operators, system programmers, vendor maintenance personnel, and disk space managers may have access to disks to make backup copies, perform disk space management (compressing and defragmenting disk space) of disk media and devices. In addition, backup tapes may be accessible by operators, tape librarians, transportation personnel (for off site storage) and even building maintenance personnel.

With so many copies of a program and with so many personnel who have access to these programs, there is the problem of these program copies being modified without authorization, or the problem of an incorrect version of a program being executed. Many attempts have been made to solve the above problem, however, these solutions are not without their shortcomings.

One such solution is described in U.S. Pat. No. 4,425,618 to T. P. Bishop et al which discloses the use of time stamps to determine current versions of a program. This patent, however, does not teach the use of cryptographic techniques, and the time stamping described therein operates at program execution time and not at link edit or load time. Another such solution is described in U.S. Pat. No. 4,465,901 to Best. This patent deals with the description of encrypted programs in main memory as they are being executed. However, decryption of encrypted programs during execution requires major changes to existing computer architecture. Furthermore, this decryption of encrypted programs during execution increases the cost and complexity of existing computer systems while decreasing their performance. Also, intolerable problems in the area of software maintenance are introduced with this decryption during program execution. Although techniques such as described in Best have been known for some time, they have not been implemented for reasons described above.

Pending applications relating to software security were recently filed. These applications are assigned to the same entity as the present application. The serial numbers of the pending applications are as follows: S.N. 927,286, S.N. 927,297, S.N. 927,298 now U.S. Pat. No. 4,860,351, S.N. 927,299, S.N. 927,306, S. N. 927,309, S.N. 927,629 now Pat. No. 4,817,140. A number of these pending patent applications describe the use of a protected table to access decryption keys; however, the keys in these applications are not embedded in the encrypted program for the purpose of protecting against an incorrect version from being executed. Furthermore, in these pending applications, the protected table is accessed only by the supervisor process, which is an execute time activity.

Thus there is a need for a method of preventing an incorrect program version from being executed using secure cryptographic techniques wherein programs in main memory are executed in plain text.

SUMMARY OF THE INVENTION

It is, therefore, an object of this invention to prevent an incorrect program version from being executed, while at the same time executing programs which are in plain text when they are stored in the main memory of a computer system. This invention directs particular attention to copies of programs which exist outside of a secure central computer facility location.

Accordingly, the present invention relates to a method and apparatus to prevent an incorrect program from executing in a computer system. More specifically, this invention provides for encrypting a load module which contains the current program (correct program version) as well as a synchronization key. The load module is encrypted with the same key which is stored in the load module. The synchronization key and the name of the load module are then stored in a table of a secure memory. When one wishes to execute a requested program to be protected, one first obtains a synchronization key corresponding to the name of the requested program. This key is obtained from the table in the secure memory. One then decrypts the load module containing the requested program with the synchronization key obtained from the table in the secure memory. After decryption of the load module, one then extracts the synchronization key in the load module. The synchronization key found in the load module is then compared with synchronization key found in the table of the secure memory. If the two keys are found to have a predetermined relationship, the requested program will then be allowed to execute by having the requested program stored in the main memory of the computer for execution.

BRIEF DESCRIPTION OF THE DRAWINGS

FIG. 3 is a flowchart schematically illustrating the method of preventing an incomplete program version from being executed.

DESCRIPTION OF THE PREFERRED EMBODIMENT

Figure 1:
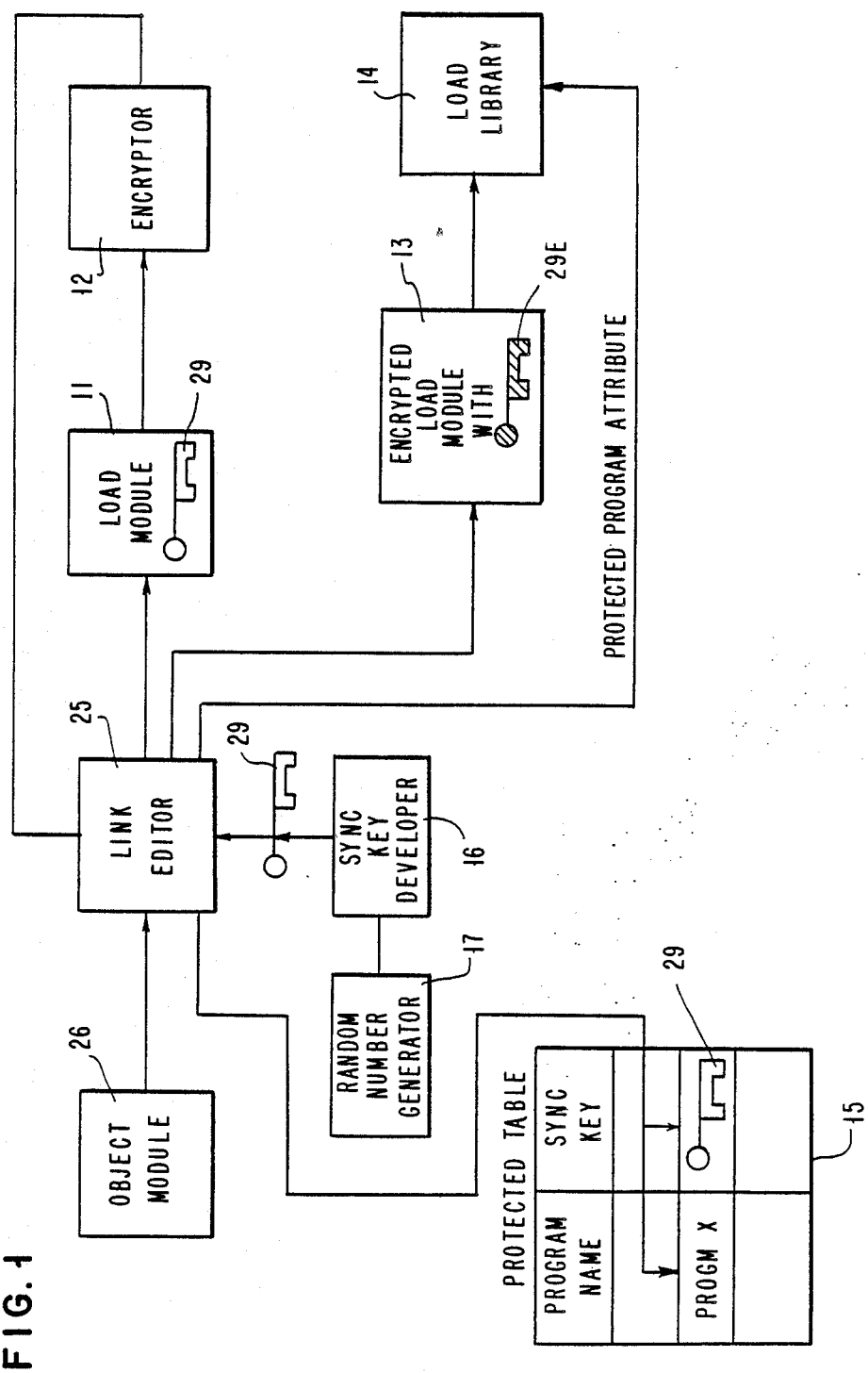
FIG. 1 is a schematic representation of the method or apparatus to encrypt a correct program version.
Figure 2:
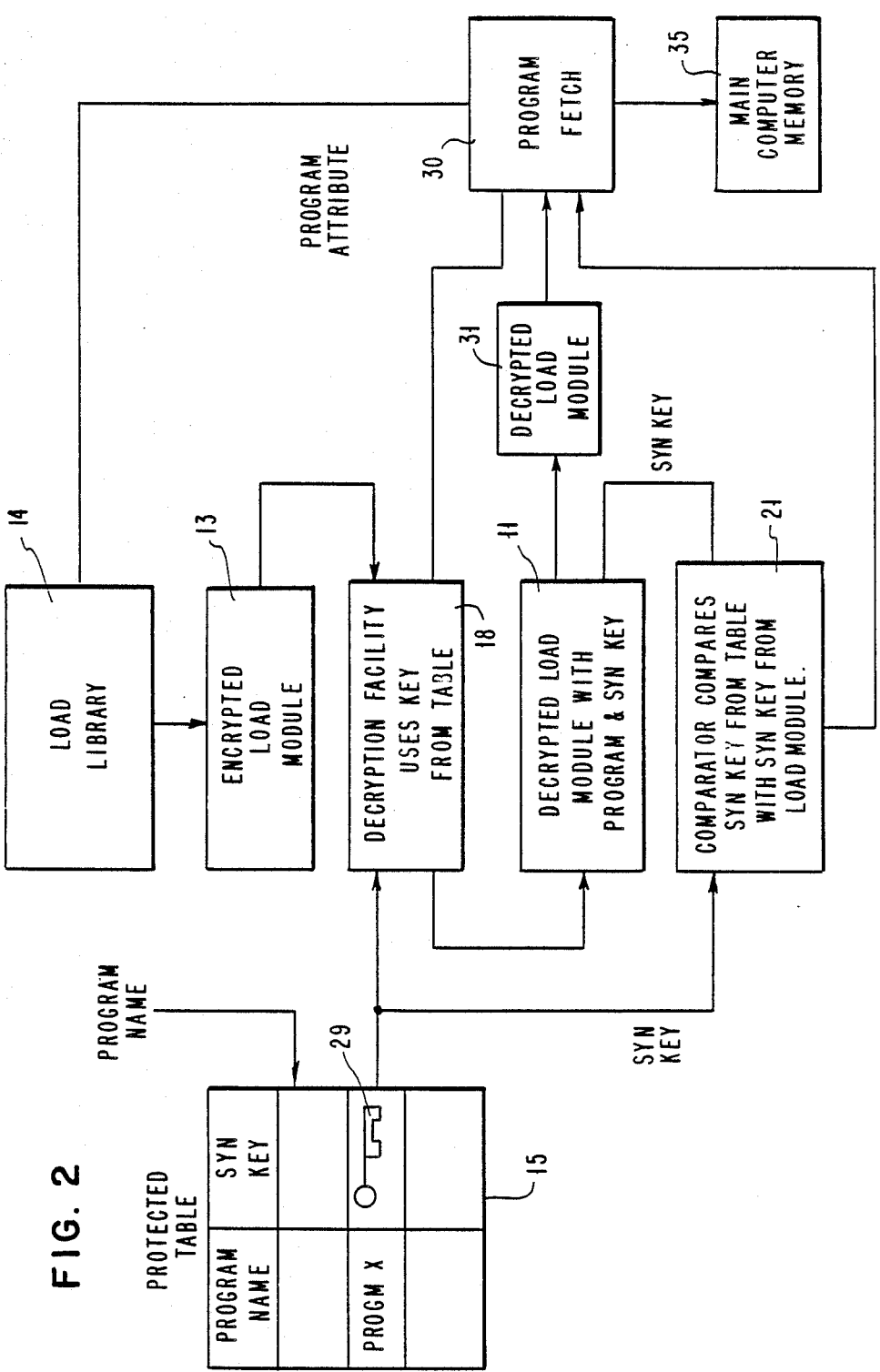
FIG. 2 is a schematic illustration of the method or apparatus to decrypt a load module containing the correct program version and to verify that a program is the correct program version.

Shown in FIGS. 1 and 2 is a schematic illustration of the apparatus used to prevent an incorrect program version from executing. More specifically, FIG. 1 schematically illustrates the apparatus used to protect and store a program for future use, while FIG. 2 is a schematic illustration of the apparatus used to remove a protected program from storage so that it can be executed in the main memory of a computer system.

Referring now to FIG. 1, a correct program version contained in an object module 26 is formed into load module 11 which also contains a synchronization key 29. The load module is then encrypted by encryption facility 12 resulting in encrypted load module 13, which contains encrypted key 29E. Any of many secure encryption mechanisms is applicable such as DES. This load module also includes the synchronization key 29. The encrypted load module 13 is then written in load library 14 by the link editor 25. The link editor 25 also writes the program attribute 27 into the directory entries of the load library. This attribute is a bit used to indicate a protected program which is to be protected in the manner described in this application. The correct program name (or the name of the load module) along with the associated synchronization key is also stored in a table 15 of a secure memory. The synchronization key is developed from a random number which is generated from random number generator 17. This random number is then used by the synchronization key developer 16 to yield synchronization key 29. This synchronization key is the key that is stored in the protective table 15, and it is also the key used by the encryption facility 12 to encrypt the load module 11.

Referring now to FIG. 2, a schematic illustration of the facilities used to execute a correct program version is shown. Let us assume for the purposes of illustration that we wish to execute program X which was protected as described above. When a program is to be executed, program fetch 30 first checks the attributes in the load library 14 to see if the program is a protected program. If the program is to be protected, the following steps are taken. First, through instructions contained in program fetch 30, the program name and the encrypted load module 13 is sent to the decryption facility 18. Then, this program name of the correct version of the program is found in protected table 15 by the decryption facility 18. When this program name is located, the synchronization key can then be found in this protected table. Then, the encrypted load module 13 containing a putative correct program version is decrypted by the decryption facility with the synchronization key found in the protected table 15. A synchronization key extracted from the decrypted load module 19 is then compared with the synchronization key found in the protected table 15 by comparator 21. If the synchronization key extracted from the load module 13' is the same as the synchronization key 29 extracted from protected table 15, then a return code is sent by the decryption facility to program fetch 30 to indicate that the correct program version is in load module 11'. In such case, program fetch will then load the main computer memory 35 with the decrypted load module 31 containing the correct program version in plain text.

Figure 4:
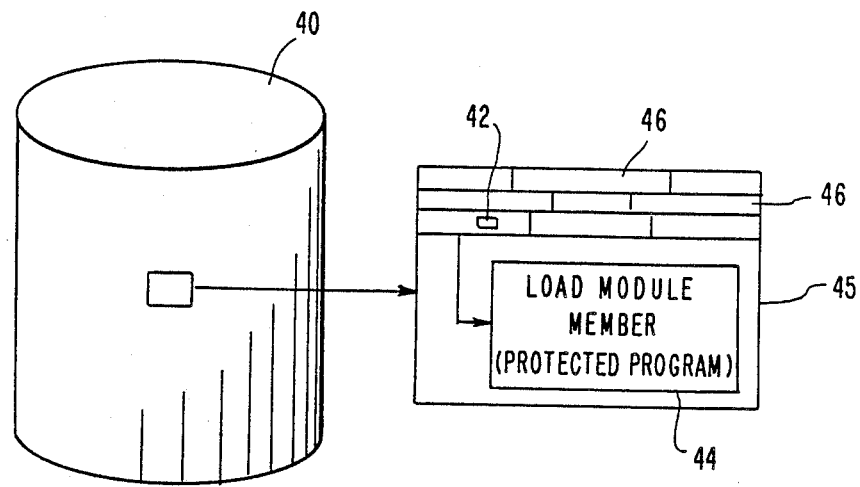

Shown in FIG. 4 is a more detailed schematic illustration of load library, 45 in storage device 40. The directory entries 46 are used to locate the various load modules (see 44 for example) in the load library. Each directory entry also has a program attribute field 42 which is used to contain a bit which indicates whether the associated load module contains a protected program.

In FIG. 3, a flowchart illustrates the overall process of this invention. The upper portion of the chart (C1 through C3) shows the overall method of protecting a correct program version, while the lower portion of the chart (C4 through C10) schematically illustrates the method used to insure that a correct program version is executed when one wishes to execute a requested program. In accordance with this invention, when one wishes to store a correct program version for future execution, steps C1 through C3 are taken. In step C1, the load module containing the correct program to be protected and the synchronization key is encrypted with the synchronization key. Then, in step C2, the encrypted load module is stored in the load library. Then in step C3, the name of the program along with its associated synchronization key is then stored in a table in a secure memory. The associated synchronization key in the table is the same key as the key in the load module which contains the program corresponding to the program name. When one wishes to request a program for execution, steps C4 through C10 are implemented. In step C4, a synchronization key is obtained from the table (see 15 of FIG. 1) in the secure memory. This key corresponds to the name of the requested program to be executed. Then in step C5, a load module containing a putative correct program version of the requested program is decrypted with the key obtained from the table in step C4. In step C6, the synchronization key is extracted from the decrypted load module. In step C7, the synchronization key obtained from the table is compared with the synchronization key extracted from the decrypted load module. In step C8, if the synchronization key from the table is equal to the synchronization key extracted from the load module, then the program in the load module is stored in the main memory for execution as in step C10. However, if the two keys are not equal, the process stops at C9 and usually a warning is sent to the user.

This invention could, for example, be applied to the IBM Systems 370 Extended Architecture System with the MVS/XA operating system Data Facilities Product software with certain modifications described below. The facilities shown in FIGS. 1 and 2 could be implemented in a combination of hardware (including microcode) and software. One such method is to have the hardware generate random numbers, synchronization keys and perform the functions of the encryption and decryption facilities (see 12 of FIG. 1 and 18 of FIG. 2, respectively). The software could do all of the actual Input/Output (I/O) operations in the load library and its directory. In any event, each of the individual hardware and software components of FIGS. 1 and 2 can be constructed or written from the descriptions included in this application. A physically and logically secure permanent memory within the computer system is used to make a protected table. This table contains, at a minimum, two columns; the program name and the synchronization key. Other columns, such as a date and time stamp, Resource Access Control Facility (RACF) User identification, and JOBNAME could also be maintained in the table. Each protected program in the system would have an entry in the table. A physically and logically secure permanent memory has existed in System 370 for many years. An example is the Hardware System Area (HSA) in S/370 308x and 309x systems which contains information on the I/O configuration (IOCDS) of the system. In this case the I/O configuration information is backed up in a physically secure direct access storage device contained physically within the service processor. The same technique could be used to back up the protected table. Access (insert, update and read) to protected table entries can be implemented with any of the table look-up algorithms including sequential search, binary search on the program name column and hashing on the program name column. Maintaining the table in program name collating sequence and using a binary search on these program names is the preferred method of accessing the protected table. If the IBM system 370 is used, the attribute field of the partitioned data set directory in the load library must be extended to contain an extra bit, which indicates if any particular program stored therein is a protected program.

To implement this invention, the standard link editor for the IBM System 370 is modified to support the protected program attribute in the load library partitioned data set directory. The modified linkage editor should ensure that all minor name entries in the partitioned data set directory contain the same setting for the protected program attribute as the corresponding major name entries in the partitioned data set directory. Link editor externals are changed to provide a method to indicate that the resultant modules should be stored in the load library with the protected program attribute set to indicate a protected program. These externals can be changed in exactly the same way that linkage editor externals today indicate that a program is to be APF (Authorized Program Facility) authorized. If the program being link edited is to be a protected program, the linkage editor will evoke the encryption facility to encrypt the program to be protected using a generated synchronization key. The linkage editor then writes the resultant encrypted load module in the load library and updates the partitioned data set directory entry attributes in the load library to indicate a protected program. The linkage editor replace indicator can be used to determine if a protected table entry may be replaced. Any of the changes to the linkage editor needed above can easily be effected by a system programmer of average skill in the art.

Program fetch is also changed to support the protected program attribute in the load library partitioned data set directory. The protected program attribute bit is examined. If the program is marked protected, program fetch will evoke the decryption facility and check the return code from the decryption facility. The decryption facility will indicate (via a return code) if the requested program was the current and correct version and has been decrypted in main storage. In this case program fetch loads the main memory of the computer with protected program in plain text; otherwise, an error is indicated by program fetch. Any of the changes to the program fetch needed above can easily be effected by a system programmer of average skill in the art.

Appropriate messages and codes (ABEND codes) are added to the computer system to indicate various error conditions that may occur. For example, the following situations would need messages and/or ABEND codes:

(1) Program not current version
(2) Request to add a protected table entry when an existing entry exists and the "replace" option was not requested
(3) Load module is encrypted and the PDS directory entry does not indicate a protected program
(4) program not found in the protected table.

An example of a known protected table would be the IOCDS table used in the 3081 processors.

It is thought that the method of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described my invention, what I claim as new and desire to secure by Letters Patent is:

1. A method of preventing an incorrect program from executing in a computer system, said method using a single processor of said system and said method assuming the one seeking to execute said program is authorized to execute said program, said method comprising the steps of:

(a) encrypting with a linking means a load module, containing a correct program version to be protected and a respective synchronization key, with the synchronization key when one wishes to store the correct program version for future execution;

(b) storing with a linking means the respective synchronization key and the name of the load module in a table of a secure memory when one wishes to store the correct program version as in step (a);

(c) obtaining with a decryption facility a synchronization key corresponding to the name of a requested program to be executed from the table in the secure memory if one wishes to execute the requested program, which requested program was stored in the same manner as provided for in steps (a) and (b);

(d) decrypting with a decryption facility the load module putatively containing the requested program with the synchronization key obtained in step (c) if one wishes to execute the requested program, the load module in this step being encrypted as in step (a) before being decrypted as in this step;

(e) extracting with a decryption facility the synchronization key in the decrypted load module of step (d) if one wishes to execute the requested program;

(f) comparing with a decryption facility the synchronization key obtained in step (c) with the synchronization key extracted in step (e) if one wishes to execute the requested program; and (g) allowing with a decryption facility the requested program, which was decrypted in step (d), to be loaded into main memory and executed if the synchronization keys compared in step (f) are found to have some predetermined relationship.

2. A method as recited in claim 1, wherein the load module comprises a load library said library comprises a partitioned data set directory with each entry of the directory having an attribute field to indicate whether a corresponding program is a protected program.

3. A method as recited in claim 1, wherein the synchronization key corresponding to the requested program is obtained by accessing the protected table by using a table look up search algorithm using program name columns as key fields.

4. A method of preventing an incorrect program from executing in a computer system, said method using a single processor of said system and said method assuming the one seeking to execute said program is authorized to execute said program, said method comprising the steps of:

(a) encrypting a load module with a linking means, containing a correct program version to be protected and a respective synchronization key, with the synchronization key when one wishes to store the correct program version for future execution;

(b) storing with a linking means the respective synchronization key and the name of the load module in a table of a secure memory when one wishes to store the correct program version as in step (a);

(c) obtaining a with a decryption facility synchronization key corresponding to the name of a requested program to be executed from the table in the secure memory if one wishes to execute the requested program, which requested program was stored in the same manner as provided for in steps (a) and (b);

(d) decrypting with a decryption facility the load module putatively containing the requested program with the synchronization key obtained in step (c) if one wishes to execute the requested program, the load module in this step being encrypted as in step (a) before being decrypted as in this step;

(e) extracting with a decryption facility the synchronization key in the decrypted load module of step (d) if one wishes to execute the requested program;

(f) comparing with a decryption facility the synchronization key obtained in step (c) with the synchronization key extracted in step (e) if one wishes to execute the requested program; and (g) loading the requested program, which was decrypted in step (d), in a main memory of the computer system for execution thereof, if the synchronization keys compared in step (f) are found to be the same.

* * * * *